United States Patent Office 3,016,922
Patented Jan. 16, 1962

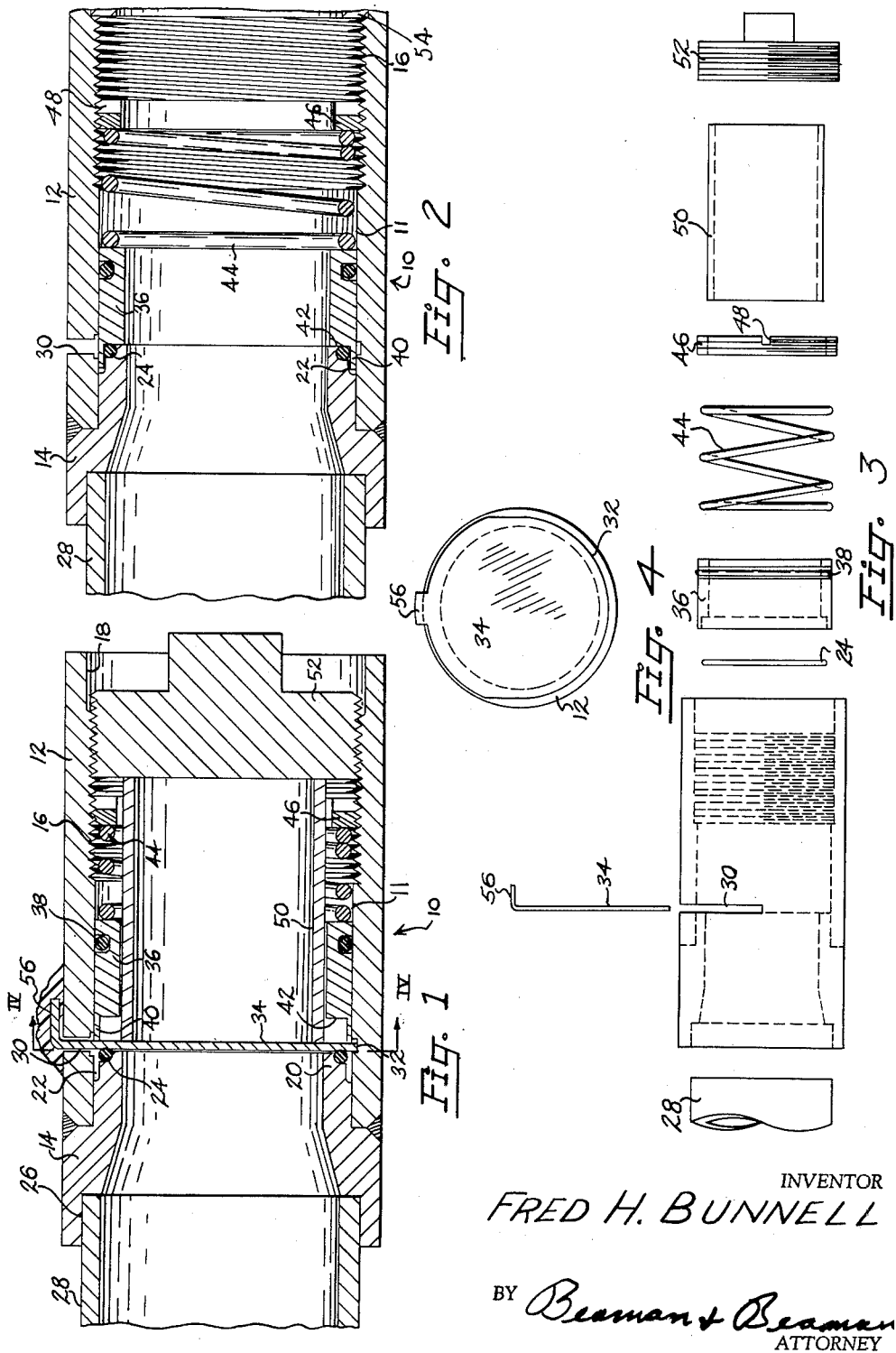

3,016,922
CONDUIT TERMINAL FITTING
Fred H. Bunnell, 719 Woodfield Drive, Jackson, Mich.
Filed June 27, 1958, Ser. No. 745,191
4 Claims. (Cl. 138—94)

The invention relates to pipe or conduit fittings and particularly pertains to a terminal fitting for use with gas or liquid lines whereby the line may be extended while under pressure.

It is often desirable to provide means to extend a gas or fluid line while the line is under pressure and various devices have been used to achieve this purpose. Of course the most common method is to initially attach a conventional gate or other type of manually operated valve to the end of the line whereby the pipe line extension may be attached to the valve outlet. To use such conventional valves extensively in this manner is prohibitively expensive in that such valves are costly and are not practical for use merely to close the end of a conduit which may or may not be extended at some time in the future. The use of a conventional valve as a terminal fitting also presents a safety problem, especially with gas lines, in that the valve may be operated by children permitting gas to escape.

It is thus an object of the invention to provide an inexpensive pressurized pipe line fitting which will effectively seal the end of a pipe, yet may function as a single operation valve when used as a coupling to extend the pipe line whereby the pressure in the pipe line need not be shut off during the extension connection.

Another object of the invention is to provide a terminal fitting which may be attached to a pipe line by either threaded, welded or sleeve joints and which may be constructed of inexpensive screw machine producable components.

A further object of the invention is to produce a terminal fitting incorporating an automatic self closing gate aperture closure which prevents leakage during withdrawal of the gate and permits the aperture to be welded closed if desired.

Another object of the invention is to provide a terminal fitting for use with a pressurized pipe line incorporating a metal sleeve and resilient O ring adapted to form a sealing engagement upon withdrawal of the gate from the aperture.

Yet a further object of the invention is to provide a terminal fitting wherein the moving and working parts of the fitting are sealed from contact with the medium within the pressurized pipe line.

These and other objects of the invention will become apparent upon an understanding of the accompanying description and drawings wherein:

FIG. 1 is a cross sectional elevational view taken along the longitudinal axis of the valve coupling of the invention with the gate in position, FIG. 2 is an elevation cross sectional view of the coupling of the invention when used to extend a pipe line and the gate has been withdrawn from the aperture, FIG. 3 is an exploded elevational view of the components comprising the terminal fitting, and FIG. 4 is a cross sectional elevational view taken along the line IV—IV of FIG. 1.

The terminal fitting of the invention may be made in various sizes for use with conventional pipes and conduits and comprises a tubular body 10 composed of interfitting cylinders 12 and 14 which are welded together to form a unitary structure having a bore 11. The bore 11 is internally threaded at 16 and the threads may extend to the open end 18 of the cylinder or the cylinder may be internally machined adjacent end 18 to provide a smooth bore depending on whether a threaded or welded connection to the extension pipe is desired. The cylinder 14 is provided with an annular projection 20 adapted to closely fit within the internal bore 11 and is recessed at 22 to form an annular clearance between projection 20 and cylinder 12 adjacent the end of the projection. The end of projection 20 forms a shoulder and is machined with a groove within the end thereof to receive a resilient annular seal ring 24. The seal ring extends slightly beyond the end of projection 20 such that the gate abutting the end of the projection is sealed with respect thereto as will be later explained. Cylinder 14 is provided at the open end with a machined portion 26 which may be either threaded or smooth bored depending on the type of connection used with the conduit 28 which contains the pressurized fluid.

It will be understood that the body 10 may be formed as a single member wherein recess 22, projection 20 and the sealing ring groove may be machined in the body. However, by forming body 10 of assembled cylinders 12 and 14 conventional tooling may be employed to form the projection and recess.

The cylinder 12 is provided with a slot or aperture 30, FIG. 3, which is of greater width than the diameter of the cylinder bore 11. Slot 30 extends through the upper portion of the cylinder and forms an annular groove or recess 32 within the lower half of the cylinder 12 whereby a planar gate 34 may be inserted into the slot 32 and rests within recess 30 to completely block the passage through the body 10. The slot 30 and recess 32 extend transversely to the axis of the body 10 and is aligned such that the gage 34 is adjacent to and contacts the sealing ring 24.

A sleeve 36 is slidingly supported within the bore 11 and sealed thereto by an O ring 38. As will be noted the sleeve 36 is formed with an annular lip 40 and a shoulder 42 which cooperate with the recess 22 and seal ring 24, respectively, upon removal of gate 34 as later described. The sleeve 36 is biased into engagement with gate 36 by a spring 44 whose compression may be adjusted by the annular back-up ring 46. Ring 46 is externally threaded and cooperates with the threads 16, wrench engaging notches 48 permit the ring to rotate and be axially positioned as desired.

It will thus be appreciated that as the end of lip 40 engages the gate 34, FIG. 1, the gate will be held in engagement with seal 24 and pressurized fluid within conduit 28 will not pass beyond the gate, effectively terminating the end of a pressure line.

The primary force maintaining gate 34 and ring 24 in engagement is produced by the abutment sleeve 50 which is held against the gate by the threaded plug 52 mating with threads 16. The sleeve 50 is of sufficient diameter to contact the gate substantially opposite to the seal 24 to prevent distortion of the gate under the axial force exerted by the sleeve upon tightening of the plug 52. Thus, in initially assembling the fitting the sleeve 50 is inserted in the bore 11 after gate 34 is in position and the plug 52 screwed into the bore until the desired force is exerted on the gate.

In use the body 10 is affixed to the pressure pipe or conduit 28 and the terminal fitting assembled as in FIG. 1 to effectively seal the end of the conduit. The gate 34 is completely inserted within slot 30 and recess 32; spring 44 is under compression and plug 52 is tightened down to exert sufficient axial force on the gate, through sleeve 50, to compress ring 24 maintaining a seal between the gate and ring 24.

The fitting thus assembled will remain in this state until it is desired to extend the conduit 28. To continue the conduit, the plug 52 is unscrewed and the sleeve 50 removed and an extension pipe or conduit 54 affixed to the end 18 of the body 10 either by threads or welding as mentioned above. The gate 34 remains seated with ring 24 due to the pressure exerted on the gate by spring 44 and sleeve 36 and the appliance or fluid consuming device may be connected to the conduit 54 as desired. To introduce gas or other fluid into conduit 54 the handle 56 of the gate 34 is grasped and the gate pulled from the slot 30. Upon removal of the gate the sleeve 36 will move to the left, as in FIG. 2, wherein the lip 40 projects into recess 22 and the shoulder 42 engages seal ring 24 and the slot 30 is sealed off from the interior of body 10. Fluid may now flow through the fitting without restriction and there will be no leakage through slot 30. The engagement of the lip 40 with the recess 22 serves to align the sleeve 36 with the seal ring 24 and also insures that the slot 30 is completely closed, extending the end of the sleeve well beyond the slot.

If desired, the slot 30 may be welded closed for further assurance against leaks or other means may be used to close the slot such as sealing compounds, cements, etc., it being understood that such sealing is only by way of extra protection. It may also be desirable to use a removable protective seal such as heavy grease or a plastic compound over slot 30, when the gate is in place as in FIG. 1, to prevent moisture from entering the interior of body 10 and corroding the internal parts. Should corrosion due to internal condensation or other causes create a tendency for the sleeve 36 to stick within the cylinder 12, the withdrawal of gate 34 from slot 30 will cause sleeve 36 to cock slightly as the gate is removed from contact with the lower portion of lip 40 while the upper half of the lip is still abutting the gate and such cocking will usually be sufficient to free the sleeve for completed axial movement upon complete removal of the gate from the slot.

Thus a terminal fitting for a pressurized pipe line is provided which is of inexpensive construction, conforms closely to the configuration of the pipe or conduit with which it is used and permits a pipe line to be extended without shutting off the fluid pressure therein yet is safe and easy to operate even when used with combustible gases.

It will be understood that various modifications other than those illustrated may be apparent to those skilled in the art without departing from the spirit of the invention and it is intended that the invention be defined only by the scope of the following claims.

I claim:

1. In a terminal fitting adapted to be affixed to the end of a conduit, a body, an axial bore within said body in communication with said conduit, a slot defined within said body and opening into said bore, a removable gate positionable within said slot for blocking said bore, an annular projection formed on said body within said bore defining a fixed annular shoulder adjacent said gate, sealing means supported on said shoulder and engageable by said gate, an axially movable metallic sleeve within said bore, spring means baising said sleeve toward said sealing means whereby said sleeve is adapted to engage said gate in a first axial position of said sleeve for maintaining engagement of said gate with said seating means and is adapted to engage said sealing means in a second axial position coincident with said slot upon removal of said gate, thereby sealing said slot with respect to said bore.

2. In a terminal fitting as in claim 1 wherein threads are formed in said bore, a back-up ring cooperating with said spring and threaded within said bore, a removable plug threaded within said bore and an abutment sleeve interposed between said plug and gate adapted to maintain said gate in engagement with said sealing means.

3. In a terminal fitting, a body, an axial bore within said body, means within said bore adjacent the ends thereof for coupling conduits to said fitting, a slot defined within said body and intersecting said bore, a gate removably positionable within said slot for blocking said bore, an annular projection within said bore defining a shoulder adjacent said gate, sealing means mounted on said shoulder and engageable with said gate, an annular axial extending recess defined between said projection and said bore, an annular sleeve slidably supported within said bore, a lip and a shoulder formed on said sleeve and cooperable with said recess and said sealing means, respectively, upon removal of said gate for sealing said slot with respect to said bore, spring means biasing said sleeve into engagement with said gate, and sealing means interposed between said sleeve and said bore.

4. In a terminal fitting as in claim 3 wherein threads are formed in said bore, a back-up ring cooperating with said spring and threaded within said bore, a removable plug threaded within said bore and an abutment sleeve interposed between said plug and gate adapted to maintain said gate in engagement with said shoulder mounted sealing means.

References Cited in the file of this patent

UNITED STATES PATENTS

| | | |
|---|---|---|
| 2,580,595 | Renfro | Jan. 1, 1952 |
| 2,732,170 | Shand | Jan. 24, 1956 |